US006673882B2

(12) United States Patent
Liu

(10) Patent No.: US 6,673,882 B2
(45) Date of Patent: Jan. 6, 2004

(54) SUPPORTED SINGLE-SITE CATALYSTS USEFUL FOR OLEFIN POLYMERIZATION

(75) Inventor: Jia-Chu Liu, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 432 days.

(21) Appl. No.: 09/781,464

(22) Filed: Feb. 12, 2001

(65) Prior Publication Data

US 2002/0155945 A1 Oct. 24, 2002

(51) Int. Cl.$^7$ ................................................ C08F 4/42
(52) U.S. Cl. ........................ 526/161; 526/160; 526/348; 526/943; 502/152; 502/103; 502/117; 502/118
(58) Field of Search ................................. 502/152, 103, 502/117, 118; 526/161, 160, 348, 943

(56) References Cited

U.S. PATENT DOCUMENTS

| 5,470,813 | A | | 11/1995 | Le-Khac .................... 502/175 |
| 5,539,124 | A | * | 7/1996 | Etherton et al. ............ 548/402 |
| 5,554,775 | A | | 9/1996 | Krishnamurti et al. ......... 556/7 |
| 5,624,878 | A | | 4/1997 | Devore et al. ............... 502/152 |
| 5,637,660 | A | | 6/1997 | Nagy et al. ................. 526/160 |
| 5,852,146 | A | | 12/1998 | Reichle et al. ............... 526/172 |
| 5,902,866 | A | * | 5/1999 | Nagy et al. .................. 526/133 |
| 6,093,824 | A | | 7/2000 | Reichle et al. .................. 546/6 |
| 6,211,311 | B1 | | 4/2001 | Wang et al. ................. 526/131 |

OTHER PUBLICATIONS

U.S. application Ser. No. 09/716,954, filed Nov. 21, 2000, "Single–Site Catalysts for Olefin Polymerization". Jia–Chu Liu (Docket No. 88–1034A).
J. March, *Advanced Organic Chemistry*, 2d Ed. (1977) 1054–1055.

* cited by examiner

Primary Examiner—Ling-Siu Choi
(74) Attorney, Agent, or Firm—Jonathan L. Schuchardt

(57) ABSTRACT

A method for making supported single-site catalysts useful for olefin polymerization is disclosed. An organometallic complex that contains a nitrogen-functional heterocyclic ligand is first prepared and reacted with an alumoxane. This product is then combined, preferably with high-intensity mixing, with a slurry of inorganic support, followed by solvent removal to give a supported catalyst. By introducing the alumoxane at the right time during preparation, and by judicious selection and chemical treatment of the inorganic support, one can make catalysts with high activity and good aging properties. The supported catalysts give olefin polymers with a favorable balance of physical properties, including low density, narrow molecular weight distribution, good melt-flow properties, and high bulk density.

23 Claims, No Drawings

SUPPORTED SINGLE-SITE CATALYSTS USEFUL FOR OLEFIN POLYMERIZATION

FIELD OF THE INVENTION

The invention relates to catalysts useful for olefin polymerization. In particular, the invention relates to an improved method for preparing supported "single-site" catalysts based on heterocyclic ligands such as carbazolyl and quinolinoxy ligands.

BACKGROUND OF THE INVENTION

While Ziegler-Natta catalysts are a mainstay for polyolefin manufacture, single-site (metallocene and non-metallocene) catalysts represent the industry's future. These catalysts are often more reactive than Ziegler-Natta catalysts, and they produce polymers with improved physical properties. The improved properties include narrow molecular weight distribution, reduced low molecular weight extractables, enhanced incorporation of α-olefin comonomers, lower polymer density, controlled content and distribution of long-chain branching, and modified melt rheology and relaxation characteristics.

Metallocenes commonly include one or more cyclopentadienyl groups, but many other ligands have been used. Putting substituents on the cyclopentadienyl ring, for example, changes the geometry and electronic character of the active site. Thus, a catalyst structure can be fine-tuned to give polymers with desirable properties. "Constrained geometry" or "open architecture" catalysts have been described (see, e.g., U.S. Pat. No. 5,624,878). Bridging ligands in these catalysts lock in a single, well-defined active site for olefin complexation and chain growth.

Other known single-site catalysts replace cyclopentadienyl groups with one or more heteroatomic ring ligands that are pi-electron donors, such as boraaryl (see, e.g., U.S. Pat. No. 5,554,775 or azaborolinyl groups (U.S. Pat. No. 5,902,866).

U.S. Pat. No. 5,539,124 (hereinafter "the '124 patent") and U.S. Pat. No. 5,637,660 teach the use of anionic, nitrogen-functional heterocyclic groups such as indolyl, carbazolyl, 2-pyridinoxy or 8-quinolinoxy as ligands for single-site catalysts. These ligands, which are produced by simple deprotonation of inexpensive and readily available precursors, are easily incorporated into a wide variety of transition metal complexes. When used with common activators such as alumoxanes, these catalysts polymerize olefins to give products with narrow molecular weight distributions that are characteristic of single-site catalysis.

One drawback of the catalysts described above is their relatively low activity. Normally, a large proportion of an alumoxane activator must be used to give even a low-activity catalyst system. For example, in the '124 patent, Example 16, a bis(carbazolyl)zirconium complex is used in combination with methylalumoxane at an aluminum:zirconium mole ratio [Al:Zr] of 8890 to 1 to give a catalyst having a marginally satisfactory activity of 134 kg polymer produced per gram Zr per hour. The activator is expensive, and when it is used at such high levels, it represents a large proportion of the cost of the catalyst system. Ideally, much less activator would be needed to give a catalyst system with better activity. Recently, I developed an improved way to make organometallic complexes based on heterocyclic ligands and useful for olefin polymerization (see copending application Ser. No. 09/716,954, filed Nov. 21, 2000).

An unresolved challenge relates to maintaining high activity, long catalyst lifetime, and favorable polyolefin properties when the complex is used with a support. Often, combining a complex with silica, alumina, or other common supports results in a dramatic loss of catalyst activity or lifetime. These issues are not addressed in the '124 patent, which talks only in generalities about catalyst supports and provides no actual example in which a supported catalyst is used. Moreover, while application Ser. No. 09/716,954 indicates that supports can be used, the application provides no examples of how to make supported catalysts that maintain a high level of performance.

In sum, there is a continuing need for single-site catalysts that can be prepared inexpensively and in short order from easy-to-handle starting materials and reagents. In particular, there is a need for ways to make supported catalysts that have high activities and good aging properties even at low activator levels. Ideally, the supported catalysts would produce polyolefins with desirable physical properties such as low density, narrow molecular weight distribution, favorable melt-flow characteristics, and high bulk density.

SUMMARY OF THE INVENTION

The invention is a five-step method for making supported single-site catalysts useful for olefin polymerization. First, a nitrogen-functional heterocycle is deprotonated to produce an anionic ligand precursor. The heterocycle is an indole, carbazole, 8-quinolinol, 2-pyridinol, or a mixture thereof. In the second step, the anionic ligand precursor reacts with about 0.5 equivalents of a Group 4 transition metal compound in a hydrocarbon solvent to give a mixture that contains the desired organometallic complex. Third, the mixture is reacted with an alumoxane activator, preferably using high-intensity mixing. Fourth, the product from step three is combined with a hydrocarbon slurry of an inorganic support. Finally, the solvents are removed to give a solid, supported catalyst.

The invention includes supported catalysts made by this method as well as olefin polymerization processes that use the catalysts. The supported catalysts actively polymerize olefins, even when used with an exceptionally low level of an activator.

I surprisingly found that introducing the alumoxane at the right time during preparation is crucial for making highly active, supported catalysts with good aging characteristics. Moreover, by judicious selection and chemical treatment of the inorganic support, one can further improve the catalysts. The supported catalysts give olefin polymers with a favorable balance of physical properties, including low density, narrow molecular weight distribution, good melt-flow properties, and high bulk density.

DETAILED DESCRIPTION OF THE INVENTION

Although they defy easy characterization by common analytical techniques, supported catalysts prepared by the method of the invention are considered to be "single site" in nature, i.e., they incorporate distinct chemical species rather than mixtures of different species. They qualify as single-site catalysts because they typically give polyolefins with characteristically narrow molecular weight distributions (Mw/Mn<3) and good, uniform comonomer incorporation.

The supported catalysts include a complex that contains a Group 4 transition metal, M, i.e., titanium, zirconium, or hafnium. Preferred complexes include titanium or zirconium. The catalysts often include some unreacted starting materials and by-products, e.g., alkali metal or alkaline earth metal salts derived from the deprotonating agent.

In one aspect, the invention is a five-step method for preparing a supported catalyst. In the first step, a nitrogen-functional heterocycle is deprotonated. Suitable nitrogen-functional heterocycles are indoles, carbazoles, 8-quinolinols, and 2-pyridinols. These compounds can have substituents that do not interfere with deprotonation or the subsequent reaction with the transition metal compound. Many of these compounds are commercially available or are easily synthesized. For example, indole, carbazole, 8-quinolinol, and 2-pyridinol are all inexpensive and commercially available, and many indoles are easily made from arylhydrazones of aldehydes or ketones and a Lewis acid using the well-known Fischer indole synthesis (see J. March, *Advanced Organic Chemistry*, 2d ed. (1977), pp. 1054–1055, and references cited therein). Additional examples of suitable nitrogen-functional heterocycles are described in U.S. Pat. Nos. 5,637,660 and 5,539,124, the teachings of which are incorporated herein by reference.

Any suitable base can be used to deprotonate the nitrogen-functional heterocycle. Examples are alkyllithium compounds (e.g., methyllithium or n-butyllithium), alkali metals (e.g., sodium metal), alkali metal hydrides (e.g., potassium hydride), and Grignard reagents (e.g., methyl magnesium chloride or phenyl magnesium bromide). Alkyllithium compounds are preferred. These can be made by reacting lithium with an alkyl halide, but more often they are purchased as solutions in a hydrocarbon (e.g., toluene or hexanes) or ether (e.g., diethyl ether or tetrahydrofuran) solvent. Preferred alkyllithium compounds are $C_1$–$C_8$ alkyllithiums such as methyllithium, isopropyllithium, n-butyllithium, or t-butyllithium. n-Butyllithium is particularly preferred because it is readily available, relatively easy to handle, and effective.

Usually, equimolar amounts of the deprotonating agent and the nitrogen-functional heterocycle are used to produce the anionic precursor. Deprotonation can be performed at any suitable temperature, preferably at or below room temperature. While the deprotonation reaction can be performed at temperatures as low as −78° C. or below, it is preferred to perform this step at room temperature. Vigorous mixing is often essential because alkali metal or alkaline earth metal salts of the anionic ligand tend to precipitate and form a thick slurry. The reaction is usually complete within an hour or two. The resulting anionic ligand precursor includes a carbazolyl, indolyl, 8-quinolinoxy, or 2-pyridinoxy anion and an alkali metal or alkaline earth metal cation.

In Step 2, the anionic ligand precursor reacts with a Group 4 transition metal compound, preferably a tetrahalide. Suitable Group 4 transition metal compounds include zirconium, titanium, or hafnium, and four anionic ligands, which may the the same or different. The anionic ligand is preferably halide, hydride, or $C_1$–$C_{20}$ alkoxy, siloxy, dialkyamido, hydrocarbyl, or the like. Tetrahalides, such as zirconium tetrachloride or titanium tetrabromide, are especially preferred.

Reaction of about 0.5 equivalents of the Group 4 transition metal compound with one equivalent of the anionic ligand precursor gives an organometallic complex-containing mixture that includes the desired bis(carbazolyl), bis(indolyl), bis(2-pyridinoxy) or bis(8-quinolinoxy) complex. Complexes with mixed nitrogen-functional ligands (e.g., carbazolyl(8-quinolinoxy)zirconium dichloride) are conveniently made either by stepwise reaction of the Group 4 transition metal compound with two different anionic ligand precursors, or by deprotonating a mixture of the ligand precursors and reacting the mixture of anions with the Group 4 transition metal compound.

Preferred organometallic complexes have the general structure LL'MX$_2$, wherein M is zirconium or titanium, X is halide, hydride, or $C_1$–$C_{20}$ alkoxy, siloxy, dialkyamido, hydrocarbyl, and each of L and L', which may be the same or different, is selected from the group consisting of indolyl, carbazolyl, 8-quinolinoxy, and 2-pyridinoxy. More preferably, X is a halide such as Cl or Br.

In another method of the invention, the anionic ligand precursor is reacted with about one equivalent of a "Cp-like" (e.g., cyclopentadienyl, indenyl, or fluorenyl) Group 4 transition metal compound, preferably a trihalide. The Group 4 transition metal compound is conveniently made according to well-known methods, such as by reacting a cyclopentadienyl, indenyl, or fluorenyl anion with a Group 4 transition metal tetrahalide. The finished organometallic complex includes a Cp-like ligand, a nitrogen-functional ligand, and two other anionic ligands. Examples 22–28 below illustrate this method.

In any event, the complex-forming reaction is preferably performed at temperature greater than about 10° C., which is not only convenient, but gives the best results. More preferably, the reaction occurs at a temperature within the range of about 15° C. to about 60° C.; most preferably, the reaction is simply performed at room temperature. The reaction is usually complete within a few hours, but it is often convenient and desirable to allow the reaction to proceed overnight (about 16–18 hours) at room temperature.

The preparation of the organometallic complex-containing mixture is performed in the presence of a first hydrocarbon solvent. Preferred hydrocarbons are aromatic, aliphatic, and cycloaliphatic hydrocarbons having from 4 to 30 carbons, preferably 4 to 12 carbons, because these are conveniently removed from the mixture. Examples include pentanes, hexanes, cyclohexane, octanes, toluene, xylenes, and the like, and mixtures thereof. Toluene is particularly preferred.

When the reaction is complete, the mixture can be concentrated (although this is not preferred) by solvent removal under a stream of nitrogen or with vacuum stripping to give a solid residue that contains the desired organometallic complex in addition to some unreacted starting materials and some by-products. This residue commonly contains as much as 50 wt. % of recovered starting material (e.g., carbazole). Nonetheless, as shown in copending application Ser. No. 09/716,954, the residue can be used without purification in a subsequent olefin polymerization. For many olefin polymerization processes, however, it is desirable to use a supported catalyst. When, as here, a supported catalyst is the target, the solvent is preferably not removed at this stage of the process, and the solution or slurry is used "as is" in the next step.

In Step 3, the organometallic complex-containing mixture reacts with an alumoxane activator. Suitable alumoxanes are well known in the art. Examples include methyl alumoxane (MAO or PMAO), modified methyl alumoxane (MMAO), ethyl alumoxane, diisobutyl alumoxane, and the like, and mixtures thereof. Methyl alumoxane and modified methyl alumoxane are preferred.

The amount of alumoxane activator needed relative to the amount of organometallic complex depends on many factors, including the nature of the complex and activator, the desired reaction rate, the kind of polyolefin product, the reaction conditions, and other factors. Generally, however, the amount used will be within the range of about 0.01 to about 500 moles, preferably from about 0.1 to about 300 moles, of aluminum per mole of Group 4 metal, M. When MAO is used, it is preferably used at a [Al:M] molar ratio of less than about 500, more preferably less than about 300.

The ability to use low levels of an activator is a key advantage of the invention. As the examples below illustrate, MAO can be used at much lower levels than previously employed. While MAO is commonly used at [Al:M] molar ratios in the thousands (see U.S. Pat. No. 5,539,124 at Examples 16 and 22), I have now found that molar ratios as low as [Al:M]=200 or below can give catalysts with excellent activity when the supported complex is prepared as described herein. This is a valuable discovery because the activator is a major contributor to overall catalyst cost, and ways to reduce its use have long been sought by the industry.

An important aspect of the invention is the timing of the reaction of the complex with the alumoxane (see Table 1, below). I surprisingly found that the alumoxane needs to be combined and reacted with the organometallic complex before either component is combined with the support ("Method A"). If the alumoxane is combined with the support first, and the alumoxane-treated support is then reacted with the organometallic complex ("Method B"), a less active catalyst results, and polymers made from the catalyst have lower melt indices and lower bulk density. Moreover, if the alumoxane is added directly to the reactor ("Method C") rather than first combining it with the organometallic complex, a similar penalty results.

After the complex-containing mixture is reacted with an alumoxane, the product is combined with a slurry of an inorganic support in a second hydrocarbon solvent (Step 4). The second hydrocarbon, which may be the same as or different from the first hydrocarbon, is one or more hydrocarbons selected from the solvents described earlier. Thus, the second hydrocarbon is preferably an aromatic, aliphatic, or cycloaliphatic hydrocarbon having from 4 to 30 carbons.

Suitable inorganic supports include silicas, aluminas, silica-aluminas, magnesias, titanias, magnesium halides, and the like. A variety of different inorganic supports can be used with the method of the invention, but silicas are preferred because many varieties are inexpensive and readily available. Particularly preferred silicas have surface areas greater than about 500 $m^2$/g and pore volumes greater than about 2.9 mL/g. An example is MS 3050 silica, a product of PQ Corporation. As Example 1 (Table 1) below demonstrates, the most active catalysts are made with high-surface-area silica. Also suitable, although less preferred, are silicas that have somewhat lower surface areas (e.g., within the range of 280 to 350 $m^2$/g) and somewhat lower pore volumes (e.g., within the range of 1.5 to 2.0 mL/g) such as Davison 948 silica (see Examples 4 and 7, Table 1).

The loading of complex on the support varies depending upon a number of factors, including the identities of the complex and the support, the type of olefin polymerization process used, the reaction conditions, and other concerns. Usually, the amount of complex used is within the range of about 0.01 to about 10 wt. % of Group 4 transition metal based on the amount of supported catalyst. A more preferred range is from about 0.1 to about 4 wt. %.

The support is preferably treated thermally, chemically, or both prior to use to reduce the concentration of surface hydroxyl groups. Thermal treatment consists of heating (or "calcining") the support in a dry atmosphere at elevated temperature, preferably greater than about 100° C., and more preferably from about 150 to about 600° C., prior to use. A variety of different chemical treatments can be used, including reaction with organo-aluminum, -magnesium, -silicon, or -boron compounds. See, for example, the techniques described in application Ser. No. 09/318,008, filed May 25, 1999, now allowed, the teachings of which are incorporated herein by reference.

In a preferred method, a high-surface-area silica support is first calcined at a temperature less than about 200° C., and is then slurried in a hydrocarbon solvent and treated with a dialkylmagnesium compound such as di-n-butylmagnesium or butylethylmagnesium. The treated slurry is then combined with the reaction product of the alumoxane and organometallic complex, followed by solvent removal, to produce the supported catalyst. As shown in Table 2 below, treatment of the silica support with a dialkylmagnesium compound can improve catalyst activity dramatically (compare Examples 1 and 10 or Examples 4 and 11). The degree of activity improvement, however, depends somewhat on the choice of support (see Examples 7 and 14). Table 2 below shows examples of various support treatment reagents that can be used.

Heat treatment during Step 4 sometimes helps activity (see Table 4, Examples 7 and 21) and sometimes hinders it (see Examples 1 and 19 or Examples 4 and 20). The results depend on how the support is thermally and/or chemically modified prior to exposure to heat.

Mixing intensity is also important. I found that high-intensity mixing is needed during Step 4 to produce catalysts with the highest activities (see Table 3). Mechanical stirring at high rates (i.e., greater than about 300 revolutions per minute (RPM)) is preferred. Other high-intensity mixing methods such as homogenization (see, e.g., U.S. Pat. No. 5,470,813, the teachings of which are incorporated herein by reference) or impingement mixing can also be used.

In Step 5 of the method of the invention, solvents are removed from the slurry to give a solid, supported catalyst that is useful for olefin polymerization. Any desired method can be used for solvent removal. Common techniques include simple distillation, vacuum distillation, rotary evaporation, thin-film evaporation, or the like. Heating under a flow of inert gas (e.g., dry nitrogen or argon) with or without vacuum is an effective way to convert the liquid slurry to a free-flowing powder.

Storage stability is another advantage of catalyst systems prepared by the method of the invention. As the results in Table 6 below confirm, aging has a dramatic negative effect on the activity of supported catalysts made using the complexes described in U.S. Pat. No. 5,539,124. In contrast, supported catalysts made by the method of the invention retain excellent activity, even after 90 days of storage.

As Table 7 shows, the catalyst preparation method of the invention is versatile. Excellent results are obtained with a variety of organometallic complexes that incorporate nitrogen-functional heterocyclic and Cp-like ligands such as cyclopentadienyl or indenyl.

Catalysts made by the method of the invention are particularly valuable for polymerizing olefins. Preferred olefins are ethylene and $C_3$–$C_{20}$ α-olefins such as propylene, 1-butene, 1-hexene, 1-octene, and the like. Mixtures of olefins can be used. Ethylene and mixtures of ethylene with $C_3$–$C_{10}$ α-olefins are especially preferred.

Many types of olefin polymerization processes can be used. Preferably, the process is practiced in the liquid phase, which can include slurry, solution, suspension, or bulk processes, or a combination of these. High-pressure fluid phase or gas phase techniques can also be used. The process of the invention is particularly valuable for solution and slurry processes.

The olefin polymerizations can be performed over a wide temperature range, such as about −30° C. to about 280° C.

A more preferred range is from about 30° C. to about 180° C.; most preferred is the range from about 60° C. to about 100° C. Olefin partial pressures normally range from about 15 psig to about 50,000 psig. More preferred is the range from about 15 psig to about 1000 psig.

The following examples merely illustrate the invention. Those skilled in the art will recognize many variations that are within the spirit of the invention and scope of the claims.

Catalyst Preparation by "Method A"

Preparation of Silica-Supported Bis(Carbazolyl) Zirconium Dichloride

Complex Preparation (Steps 1 and 2). Carbazole (5.0 g, 30 mmol) is stirred in a flask under an atmosphere of nitrogen in a dry box for 15 min. Toluene (120 mL) is added, and the mixture is stirred for 30 min. n-Butyllithium (12 mL of 2.5 M solution in hexane, 30 mmol) is added by syringe over 5 min. to the stirred carbazole solution. The mixture is stirred at room temperature for 2 h. The mixture turns light pink, and the slurry becomes thick, requiring vigorous stirring. Zirconium tetrachloride (3.50 g, 15 mmol) and more toluene (25 mL) are added to the flask, and the mixture turns brown. Stirring is continued at room temperature for another 18 h, after which the mixture is black-brown-green. Solvents are removed under a flow of nitrogen, and the residue is vacuum dried for 3 h. A yellow solid (9.25 g) that contains 81 wt. % of the desired bis(carbazolyl) complex (15.1 wt. % Zr) is isolated.

Supporting the Complex.

A round-bottom flask is charged with MS 3050 silica (5.0 g, product of PQ Corporation) that has been calcined at 150° C. for 2 h prior to use (designated "S3" herein), and the silica is stirred under a flow of nitrogen at 100 RPM at room temperature for 15 min. Heptane (35 mL) is added, and the slurry is stirred at 200 RPM under nitrogen for 0.5 h. Di-n-butylmagnesium (5.0 mL of 10 wt. % solution in heptane, product of Akzo-Nobel) is added to the silica slurry, and the mixture is stirred at 250 RPM under nitrogen, still at room temperature, for 0.5 h.

In a separate flask, the organometallic complex-containing mixture prepared above (0.107 g, contains 0.0867 g of bis(carbazolyl)zirconium dichloride, 0.175 mmol) and toluene (10 mL) are stirred at 250 RPM under nitrogen at room temperature for 10 min. Methyl alumoxane (8.0 mL of 4.38 M solution in toluene, 35 mmol, [Al:Zr= 200]) is added, and the mixture is stirred at 250 RPM for 20 min (Step 3). The complex/MAO mixture is transferred into a syringe in a dry box.

The complex/MAO mixture is added slowly to the treated silica slurry over 10 min. with rapid (350 RPM) agitation (Step 4); stirring at 350 RPM at room temperature continues for 1 h. The stirring rate is reduced to 250 RPM, and stirring continues for 15 h. The solvents are removed (Step 5) under a flow of nitrogen with stirring at 150 RPM, and the resulting powder is further dried under vacuum for 20 min. The supported catalyst is a light-yellow solid (yield: 9.50 g).

Catalyst Preparation by "Method B" (Comparative)

Preparation of Silica-Supported Bis(Carbazolyl) Zirconium Dichloride

The bis(carbazolyl)zirconium dichloride complex is prepared as described in Method A.

The procedure for supporting the complex is modified as follows: Immediately following di-n-butylmagnesium treatment of the silica, the MAO (8.0 mL of 4.38 M solution in toluene, 35 mmol) is added to the treated silica, and the mixture is stirred at 250 RPM under nitrogen for 20 min.

The organometallic complex/toluene mixture (without any MAO), is added slowly by syringe to the MAO/di-n-butylmagnesium-treated silica over 10 min. at 350 RPM.

The rest of the procedure described earlier is followed to isolate a solid, supported catalyst (9.5 g; light yellow).

Catalyst Preparation by "Method C" (Comparative)

Preparation of Silica-Supported Bis(Carbazolyl) Zirconium Dichloride

The bis(carbazolyl)zirconium dichloride complex is prepared as described in Method A.

The procedure for supporting the complex is modified as follows: No MAO is used in making the supported catalyst. Otherwise, the procedure is identical to that described in Method A.

Catalyst Preparation Including Heat Treatment

Preparation of Silica-Supported Bis(Carbazolyl) Zirconium Dichloride

The procedure of Method A is modified by including a heating step as follows: After adding the MAO/organometallic complex mixture to the n-butylmagnesium-treated silica slurry, and after the one-hour stir period, the reaction mixture is heated at 50° C. for 1 h while stirring at 300 RPM. The mixture is then stirred for 15 h at room temperature, and the solid, supported catalyst is isolated as described earlier.

Ethylene Polymerization (Catalyst Made by Method A or B)

Ethylene, isobutane, and nitrogen are dried prior to use with 13x molecular sieves. A 2-L stainless-steel reactor is preconditioned by heating it to 120° C. and maintaining that temperature for 20 min. under a flow of nitrogen. 1-Hexene (100 mL) is then added to the reactor.

Triisobutylaluminum (0.5 mL or 3.0 mL of a 0.9 M solution in heptane, 0.45 or 2.7 mmol; the amount used depends upon the moisture level of the feedstock and the reactor system) is charged to one side of a two-side injector. The other side of the injector is charged with the supported catalyst (50–100 mg) and toluene (1.0–2.0 mL).

The triisobutylaluminum solution is flushed into the reactor with isobutane (750 mL). The agitator is started, and the temperature controller is set to maintain a constant reactor temperature of 75° C.

The reactor is pressurized with ethylene to 400 psig. The supported catalyst is then flushed into the reactor along with more isobutane (50 mL) to initiate the polymerization. Ethylene is fed on demand using a Brooks mass flow meter to maintain a pressure of 400 psig in the reactor. The concentration of ethylene in the isobutane is about 13 mole %. The polymerization continues at 75° C for 0.5 to 1 hour, and is then terminated by closing the ethylene feed valve and venting the reactor. The resulting polyethylene is collected and dried under vacuum at 50° C.

Ethylene Polymerization (Catalyst Made by Method C)

The procedure described in the preceding paragraphs is followed except that the methyl alumoxane, rather than being a component of the supported catalyst, is introduced directly into the reactor at the start of the polymerization. Thus, the reactor is charged with comonomer (1-butene or 1-hexene), and then the triisobutylaluminum solution is flushed into the reactor from one side of a two-sided injector with isobutane (750 mL). After the reactor is pressurized with ethylene, a mixture of MAO (less than 0.1 mL of 4.38 M solution in toluene; the amount is based on [Al:Zr=200]), and the supported catalyst suspended in toluene is charged immediately into the reactor from the other side of the injector along with more isobutane (50 mL), and the polymerization begins. The polyethylene product is isolated as described above.

COMPARATIVE EXAMPLE

Preparation of a Silica-Supported Bis(Carbazolyl) Zirconium Complex

Complex Preparation:

The procedure of Example 22 of U.S. Pat. No. 5,539,124 is followed to prepare bis(carbazolyl) zirconium dichloride. This procedure reacts tetrakis(diethylamido)zirconium with carbazole followed by chlorination with silicon tetrachloride.

Supporting the Complex:

The complex is supported on Davison 948 silica that has been pretreated with hexamethyldisilazane followed by calcination at 600° C. for 4 h (designated "S2" silica herein) using the procedure described in Method A.

The supported catalyst is used to polymerize ethylene using the Method A procedure described above. Results appear in Table 5. As shown in the table, this catalyst is far less active than a supported catalyst prepared using the method of the invention, and it produces a polymer with a significantly broader molecular weight distribution and lower bulk density.

The preceding examples are meant only as illustrations. The following claims define the invention.

TABLE 1

Ethylene Polymerization Using Silica-Supported Bis(carbazolyl)zirconium Dichloride/Methylalumoxane (MAO) Effect of Timing of MAO Incorporation

| Ex. # | Silica Support | Catalyst Preparation Method | MAO [Al:Zr] molar ratio | Activity (kg/g Zr/hr) | MI (dg/min) | MIR | MWD | Density (g/mL) | Bulk Density (g/cm³) |
|---|---|---|---|---|---|---|---|---|---|
| 1 | S3 | A | 200 | 900 | 2.68 | 18 | 2.59 | 0.921 | 0.37 |
| C2 | " | B | 200 | 422 | 0.82 | 20 | 2.61 | 0.921 | 0.33 |
| C3 | " | C | 200 | 408 | 0.55 | 19 | 2.67 | 0.922 | 0.36 |
| 4 | S2 | A | 200 | 703 | 1.01 | 17 | 2.72 | 0.921 | 0.27 |
| C5 | " | B | 200 | 248 | 0.11 | 21 | 2.65 | 0.923 | 0.13 |
| C6 | " | C | 200 | 239 | 0.47 | 21 | 2.76 | 0.924 | 0.15 |
| 7 | 51 | A | 200 | 191 | 0.19 | 18 | 2.79 | 0.924 | 0.21 |
| C8 | " | B | 200 | 106 | 0.17 | 20 | 2.76 | 0.922 | 0.14 |
| C9 | " | C | 200 | 98 | 0.11 | 20 | 2.81 | 0.925 | 0.16 |

All supports are treated with dibutylmagnesium and stirred at room temperature for 0.5 h prior to combination with the organometallic complex.
S3 = MS 3050 silica (product of PQ Corporation) that is calcined at 150° C. for 2 h prior to use.
S2 = SiO2 948 silica (product of Davison) that is calcined at 250° C. for 2 h prior to use.
S1 = SiO2 948 silica (product of Davison) that is treated with hexamethyldisilazane (HMDS) and then calcined at 600° C. for 4 h prior to use.
Method A: Reacts MAO with the organometallic complex before combining with the silica support (this invention)
Method B: Reacts MAO with the silica support, then adds the organometallic complex (comparative method).
Method C: Does not react the MAO with the complex or the support; adds MAO directly to the reactor (comparative method).

TABLE 2

Ethylene Polymerization Using Silica-Supported Bis(carbazolyl)zirconium Dichloride/Methylalumoxane (MAO) Effect of Chemical Treatment of the Support

| Ex. # | Silica Support | Treatment Reagent | MAO [Al:Zr] molar ratio | Activity (kg/g Zr/hr) | MI (dg/min) | MIR | MWD | Density (g/mL) | Bulk Density (g/cm³) |
|---|---|---|---|---|---|---|---|---|---|
| 1 | S3 | Bu₂Mg | 200 | 900 | 2.68 | 18 | 2.59 | 0.921 | 0.37 |
| 10 | " | none | 200 | 356 | 0.74 | 21 | 2.82 | 0.923 | 0.28 |
| 4 | S2 | Bu₂Mg | 200 | 703 | 1.01 | 17 | 2.72 | 0.921 | 0.27 |
| 11 | " | none | 200 | 265 | 0.09 | 20 | 2.9 | 0.926 | 0.21 |
| 12 | " | EtBuMg | 200 | 467 | 0.18 | 22 | 2.48 | 0.923 | 0.15 |
| 13 | " | SiCl₄ | 200 | 168 | 0.16 | 21 | 2.72 | 0.925 | 0.13 |
| 7 | S1 | Bu₂Mg | 200 | 191 | 0.19 | 18 | 2.79 | 0.924 | 0.21 |
| 14 | " | none | 200 | 246 | 0.41 | 18 | 2.61 | 0.923 | 0.22 |

When a treatment agent is used, it is combined with the silica and stirred for 0.5 h at room temperature.
S3 = MS 3050 silica (product of PQ Corporation) that is calcined at 150° C. for 2 h prior to use.
S2 = SiO2 948 silica (product of Davison) that is calcined at 250° C. for 2 h prior to use.
S1 = SiO2 948 silica (product of Davison) that is treated with hexamethyldisilazane (HMDS) and then calcined at 600° C. for 4 h prior to use.
In each example, Method A is used: Reacts MAO with the organometallic complex before combining with the silica support, then stirs at room temperature for 15 h (this invention).

TABLE 3

Ethylene Polymerization Using Silica-Supported
Bis(carbazolyl)zirconium Dichloride/Methylalumoxane
(MAO) Effect of High-Intensity Mixing During Step 4

| Ex. # | Silica Support | Stirring type | RPM (step 3) | Activity (kg/g Zr/hr) | Bulk Density (g/cm$^3$) |
|---|---|---|---|---|---|
| C15 | S3 | magnetic | not applicable | 300 | 0.10 |
| 16 | S3 | mechanical | 200 | 400 | 0.15 |
| 17 | " | mechanical | 250 | 420 | 0.27 |
| 18 | " | mechanical | 300 | 630 | 0.33 |
| 1 | " | mechanical | 350 | 900 | 0.37 |

The supports are treated with dibutylmagnesium and stirred at room temperature for 0.5 h prior to combination with the organometallic complex.
S3 = MS 3050 silica (product of PQ Corporation) that is calcined at 150° C. for 2 h prior to use.
In each example, Method A is used: Reacts MAO with the organometallic complex before combining with the silica support, then stirs at room temperature for 15 h (this invention).

TABLE 4

Ethylene Polymerization Using Silica-Supported Bis(carbazolyl)zirconium
Dichloride/Methylalumoxane (MAO) Effect of Heating During
Dibutylmagnesium Treatment of the Silica

| Ex. # | Silica Support | Treatment Temp (° C.) | Activity (kg/g Zr/hr) | MI (dg/min) | MIR | MWD | Density (g/mL) | Bulk Density (g/cm$^3$) |
|---|---|---|---|---|---|---|---|---|
| 1 | S3 | 25 | 900 | 2.68 | 18 | 2.59 | 0.921 | 0.37 |
| 19 | " | 50 | 280 | 1.83 | 20 | 2.75 | 0.923 | 0.33 |
| 4 | S2 | 25 | 703 | 1.01 | 17 | 2.72 | 0.921 | 0.27 |
| 20 | " | 50 | 232 | 0.83 | 20 | 2.45 | 0.924 | 0.25 |
| 7 | S1 | 25 | 191 | 0.19 | 18 | 2.79 | 0.924 | 0.21 |
| 21 | " | 50 | 375 | 0.42 | 18 | 2.56 | 0.921 | 0.26 |

All supports are treated with dibutylmagnesium and stirred at room temperature for 0.5 h prior to combination with the organometallic complex.
S3 = MS 3050 silica (product of PQ Corporation) that is calcined at 150° C. for 2 h prior to use.
S2 = SiO2 948 silica (product of Davison) that is calcined at 250° C. for 2 h prior to use.
S1 = SiO2 948 silica (product of Davison) that is treated with hexamethyldisilazane (HMDS) and then calcined at 600° C. for 4 h prior to use.
In each example, Method A is used: Reacts MAO with the organometallic complex before combining with the silica support, then stirs at room temperature for 15 h (this invention).

TABLE 5

Ethylene Polymerization Using Silica-Supported Bis(carbazolyl)zirconium
Dichloride/Methylalumoxane (MAO) Comparison with the Bis(carbazolyl)zirconium
Complex of U.S. Pat. No. 5,539,124

| Ex. # | Silica Support | Method of Complex Preparation | MAO [Al:Zr] molar ratio | Activity (kg/g Zr/hr) | MI (dg/min) | MIR | MWD | Density (g/mL) | Bulk Density (g/cm$^3$) |
|---|---|---|---|---|---|---|---|---|---|
| 4 | S2 | see Ex. 4 | 200 | 703 | 1.01 | 17 | 2.72 | 0.921 | 0.27 |
| C22 | " | '124 patent, Ex. 22 | 200 | 60 | 0.17 | 20 | 3.50 | 0.920 | 0.15 |

Both supports are treated with dibutylmagnesium and stirred at room temperature for 0.5 h prior to combination with the organometallic complex.
S2 = SiO2 948 silica (product of Davison) that is calcined at 250° C. for 2 h prior to use.
In each example, Method A is used: Reacts MAO with the organometallic complex before combining with the silica support, then stirs at room temperature for 15 h (this invention).

TABLE 6

Ethylene Polymerization Using Silica-Supported
Bis(carbazolyl)zirconium Dichloride/Methylalumoxane
(MAO) Effect of Aging on Catalyst Activity

| | | Catalyst Activity (kg/g Zr/h) Days Aged --> | | | | | | |
|---|---|---|---|---|---|---|---|---|
| Ex. | Source | 0.2 | 1 | 10 | 20 | 30 | 60 | 90 |
| 23 | Ex 4 | 500 | 509 | 496 | 489 | 498 | 482 | 490 |
| C24 | Ex C22 | 90 | 50 | 15 | 0 | — | — | — |

Both supports are treated with dibutylmagnesium and stirred at room temperature for 0.5 h prior to combination with the organometallic complex.
S2 = SiO2 948 silica (product of Davison) that is calcined at 250° C. for 2 h prior to use.
In each example, Method A is used: Reacts MAO with the organometallic complex before combining with the silica support, then stirs at room temperature for 15 h (this invention).

TABLE 7

Additional Ethylene Polymerization Examples

| Ex. # | Complex | Support | Activity (kg/g M/hr) | MI (dg/min) | MIR | Density (g/mL) |
|---|---|---|---|---|---|---|
| 22 | Carbazolyl(indenyl)ZrCl$_2$ | S3 | 390 | 0.22 | 17 | 0.921 |
| 23 | " | S2 | 141 | 0.13 | 25 | 0.927 |
| 24 | " | S1 | 190 | 0.31 | 19 | 0.923 |
| 25 | Indolyl(indenyl)ZrCl$_2$ | S3 | 340 | 0.56 | 20 | 0.921 |
| 26 | 8-Quinolinoxy(indenyl)ZrCl$_2$ | S3 | 330 | 0.30 | 18 | 0.923 |
| 27 | " | S1 | 150 | 0.14 | 17 | 0.923 |
| 28 | 8-Quinolinoxy(Cp)ZrCl$_2$ | S1 | 280 | 0.21 | 19 | 0.921 |

These supports are not treated with dibutylmagnesium.
S3 = MS 3050 silica (product of PQ Corporation) that is calcined at 150° C. for 2 h prior to use.
S2 = SiO2 948 silica (product of Davison) that is calcined at 250° C. for 2 h prior to use.
S1 = SiO2 948 silica (product of Davison) that is treated with hexamethyldisilazane (HMDS) and then calcined at 600° C. for 4 h prior to use.
In Examples 22–28 (this invention), the organometallic complex is reacted with MAO for 1 h at room temperature, and the reaction product is then combined with the silica support and stirred at room temperature for 1 h, followed by solvent removal and vacuum drying.

I claim:

1. A method which comprises:
   (a) deprotonating a compound selected from the group consisting of indoles, carbazoles 8-quinolinols, 2-pyridinols, and mixtures thereof to produce an anionic ligand precursor;
   (b) reacting the anionic ligand precursor with about 0.5 equivalents of a Group 4 transition metal compound in the presence of a first hydrocarbon solvent to produce an organometallic complex-containing mixture;
   (c) reacting the mixture with an alumoxane activator;
   (d) combining the product from step (c) with a slurry of an inorganic support in a second hydrocarbon solvent; and
   (e) removing the solvents to give a solid, supported catalyst that is useful for polymerizing olefins.

2. The method of claim 1 wherein a C$_1$–C$_8$ alkyllithium compound is used for deprotonation step (a).

3. The method of claim 1 wherein the ligand precursor is a carbazolyl anion.

4. The method of claim 1 wherein the Group 4 transition metal compound is a transition metal tetrahalide.

5. The method of claim 1 wherein step (b) is performed at a temperature greater than about 10° C.

6. The method of claim 1 wherein one component of the mixture in step (b) is an organometallic complex having the structure LL'MCl$_2$, wherein M is titanium or zirconium, and each of L and L', which may be the same or different, is selected from the group consisting of indolyl, carbazolyl, 8-quinolinoxy, and 2-pyridinoxy.

7. The method of claim 1 wherein the alumoxane is selected from the group consisting of methyl alumoxanes, ethyl alumoxanes, butyl alumoxanes, and mixtures thereof.

8. The method of claim 1 wherein the alumoxane is used in an amount effective to give a molar ratio of aluminum to Group 4 transition metal [Al:M] less than about 500.

9. The method of claim 1 wherein combination step (d) is performed using high-intensity mixing.

10. The method of claim 1 wherein the inorganic support is selected from the group consisting of magnesium oxides, magnesium chlorides, aluminas, and silica-aluminas.

11. The method of claim 1 wherein the inorganic support is silica.

12. The method of claim 11 wherein the mixture from step (d) is heated after combination to a temperature greater than about 40° C.

13. The method of claim 11 wherein the silica is pretreated with a dialkylmagnesium compound prior to combination with the product from step (c).

14. The method of claim 11 wherein the silica has a surface area greater than about 500 m$^2$/g and a pore volume greater than about 2.9 mL/g, and wherein the silica is calcined at a temperature less than about 200° C. prior to use.

15. A supported catalyst made by the method of claim 1.

16. A process which comprises polymerizing an olefin in the presence of a supported catalyst made by the method of claim 1.

17. A method which comprises:
   (a) deprotonating a carbazole in the presence of a C$_1$–C$_5$ alkyllithium compound to produce an anionic ligand precursor;
   (b) reacting the anionic ligand precursor with about 0.5 equivalents of zirconium tetrachloride or titanium tetrachloride at a temperature greater than about 10° C. in the presence of a first hydrocarbon solvent to produce a biscarbazolyl complex-containing mixture;
   (c) reacting the mixture with a methyl alumoxane activator;
   (d) combining the product from step (c) with a slurry of silica in a second hydrocarbon solvent; and
   (e) removing the solvents to give a solid, supported catalyst that is useful for polymerizing olefins.

18. The method of claim 17 wherein combination step (d) is performed using high-intensity mixing.

19. The method of claim 17 wherein the mixture from step (d) is heated after combination to a temperature greater than about 40° C.

20. The method of claim 17 wherein the silica is pretreated with a dialkylmagnesium compound prior to combination with the product from step (c).

21. The method of claim 17 wherein the silica has a surface area greater than about 500 m$^2$/g and a pore volume greater than about 2.9 mL/g, and wherein the silica is calcined at a temperature less than about 200° C. prior to use.

22. A supported catalyst made by the method of claim 17.

23. A method which comprises:
   (a) deprotonating a compound selected from the group consisting of indoles, carbazoles, 8-quinolinols, 2-pyridinols, and mixtures thereof to produce an anionic ligand precursor;

(b) reacting the anionic ligand precursor with about 0.5 equivalents of a Group 4 transition metal compound of the formula $ZMX_3$ wherein M is a Group 4 transition metal, Z is selected from the group consisting of cyclopentadienyl, indenyl, and fluorenyl, and X is one or more anionic ligands selected from the group consisting of halide, hydride, $C_1$–$C_{20}$ alkoxy, siloxy, dialkylamido, or hydrocarbyl, in the presence of a first hydrocarbon solvent to produce an organometallic complex-containing mixture;

(c) reacting the mixture with an alumoxane activator;

(d) combining the product from step (c) with a slurry of an inorganic support in a second hydrocarbon solvent; and (e) removing the solvents to give a solid, supported catalyst that is useful for polymerizing olefins.

* * * * *